May 3, 1960 W. H. SILVER ET AL 2,935,141
COVER DISK FOR PLOWS
Filed Aug. 8, 1956

WALTER H. SILVER
CARL V. BECKSTROM
INVENTORS

BY
ATTORNEYS

United States Patent Office 2,935,141
Patented May 3, 1960

2,935,141
COVER DISK FOR PLOWS

Walter H. Silver and Carl V. Beckstrom, Moline, Ill., assignors, by mesne assignments, to Deere & Company, a corporation of Delaware Application August 8, 1956, Serial No. 602,883

6 Claims. (Cl. 172—164)

The present invention relates generally to agricultural implements and more particularly to trash covering attachments and the like for moldboard plows.

The objects and general nature of the present invention is the provision of a cover disk attachment for moldboard plows, particularly multi-bottom plows in which each bottom is mounted on a pivoted trip standard with which means is provided for releasing the standard upon the occurrence of an overload, as, for example, when the plow bottom strikes a substantially unyielding obstruction.

A further feature of this invention is the provision of a cover disk attachment, especially adapted to cut off the leading edge of the furrow slice and divert it and all trash into the bottom of the furrow, with new and improved means for mounting the cover disk directly on the plow standard without requiring any attachment to or connection of the cover disk support with the beams or frame of the plow.

Still further, it is a feature of this invention to provide a rear furrow wheel for a plow of the above type, in which a connection is made with the cover disk support so that when the plow trips, as upon the occurrence of an overload, the rear wheel is swung out of the way at the same time that the cover disk attachment is swung bodily forward.

These and other objetcs and advantages of the present invention will be apparent to those skilled in the art after a consideration of the following detailed description, taken in conjunction with the accompanying drawings, in which:

Fig. 2 is a view similar to Fig. 1, but taken from the opposite side of the plow, Fig. 1 being taken from the landward side of the plow while Fig. 2 is taken from the furrowward side.

Figure 2:
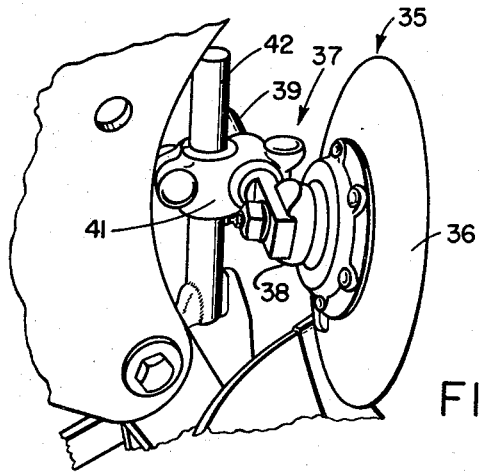
Figure 1:
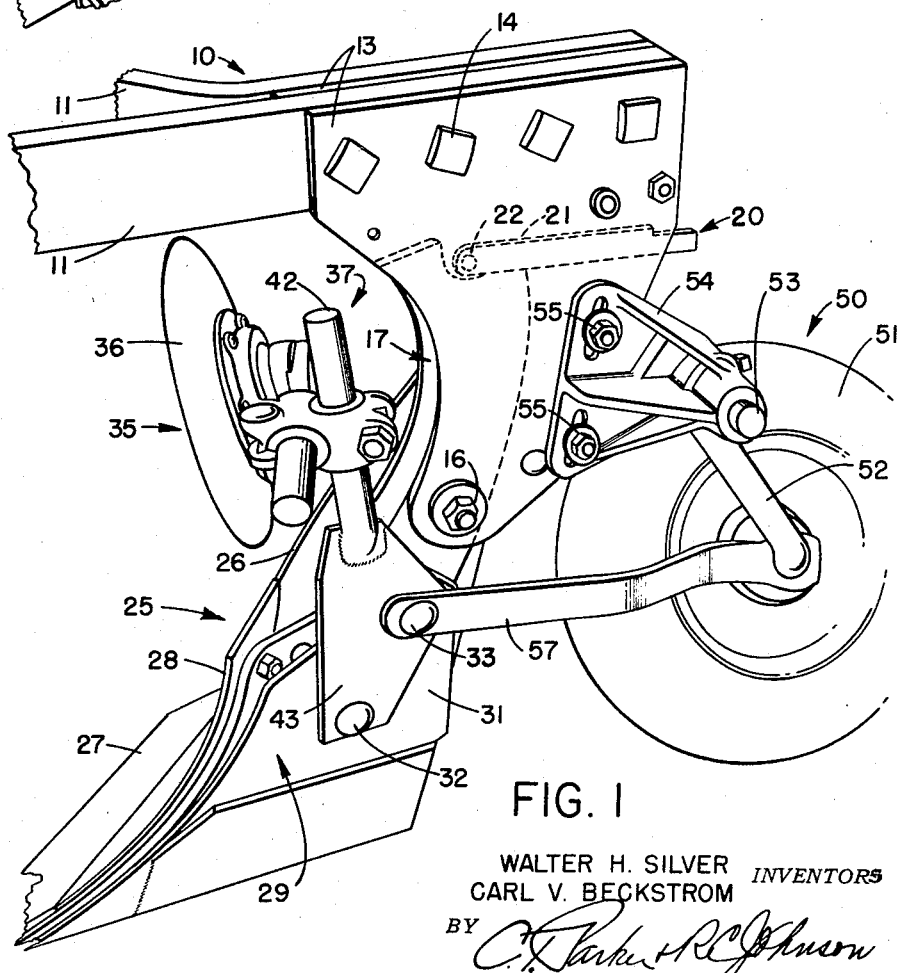
Fig. 1 is a fragmentary perspective view showing a cover disk attachment and interconnected rear wheel means, in which the principles of the present invention have been incorporated.

Referring first to Fig. 1, the implement in which the principles of the present invention have been incorporated is shown as a multi-bottom gang plow having a frame 10 that is made up of two or more longitudinally extending beams 11. Each beam is provided with a pair of depending brackets 13 that are secured, as by bolts 14, along their upper edges to the associated plow beam. The bracket plates 13 extend generally downwardly in depending relation and at their lower ends are apertured to receive a pivot member 16 on which a generally vertically arranged plow bottom receiving standard 17 is swingably mounted. Disposed between the braket plates 13 and in cooperative association with the upper end of the standard 17 is suitable overload trip mechanism, indicated in its entirely by the reference numeral 20, that normally holds the upper or notched end of the standard in generally fixed position relative to the plow frame 10. The present invention is not concerned with the particular details of the overload trip mechanism 20, which may, if desired, be substantially like that shown in U.S. Patent 2,722,877 issued November 8, 1955, to H. E. Altgelt, and for purposes of the present disclosure it will therefore suffice to note that the overload release mechanism 20 includes a spring biased arm 21 carrying a roller 22 at its forward end, which roller is spring held in the notch at the upper end of the standard 17.

The lower end of the standard 17 extends downwardly, as shown in dotted lines in Fig. 1 and receives a plow bottom 25. The latter is of usual construction, including a moldboard 26, a shear 27, and a removable shin 28, all fastened to a frog 29, the latter including a generally vertical plate section 31 at the landward side of the plow. The lower end of the standard 17 is bolted to the frog plate 31, on the inside of the latter, by a pair of bolts 32 and 33.

The cover disk attachment, with which the present invention is more particularly concerned, is indicated in its entirely by the reference numeral 35 and comprises a disk 36 mounted for rotation upon support means 37 that includes an axle member 38 secured to a shank 39 that is connected by a double clamp structure 41, to the upper end of the shank 42 the lower end of which is connected, as by welding, to a flat plate section 43 that is apertured to receive the attaching bolts 32 and 33, whereby when the latter are tightened, the frog is secured to the lower end of the standard 17 and also the cover disk supporting structure is secured thereto in a rigid manner.

The disk 35 may, by virtue of the clamp means 41 and associated parts, be disposed in different positions, as desired, but preferably the disk 36 is adjusted, both horizontally, vertically, and angularly, if necessary so that the disk works on the leading edge of the furrow slice as it passes along the upper edge of the moldboard 26, the disk severing all trash and the like and diverting it into the bottom of the furrow. Since the disk works on the leading edge of the furrow slice after the furrow slice has been cut and lifted by the plow bottom, excessive side draft and also excessive resistance to proper penetration, are eliminated.

It will be seen from the above description that, for proper operation of the cover disk, the latter must be mounted fairly close to the upper portion of the plow bottom and, also, substantially directly in front of the upper end of the standard 17. Where the latter is a pivoted part and adapted, when released, to swing forwardly, the cover disk cannot be attached directly to the plow beam 11 but, according to the present invention, preferably is mounted directly on the pivoted standard, so that when the latter is released by release of the overload mechanism, and when the plow bottom swings downwardly and rearwardly to pass over the obstruction causing the overload, the cover disk, rigidly connected to the standard 17, swings downwardly and forwardly with the plow bottom, and thus moves out of the way of both the upper edge of the moldboard and the upper end of the standard 17.

The plow shown in Fig. 1 is also provided with a rear furrow wheel means 50 that includes a rear furrow wheel proper 51 and a swingable axle member 52 that includes a laterally outwardly turned journaled section 53 rockably disposed in an adjustable bracket 54 secured, as by bolts 55, to the rear portions of the bracket plates 13. A link 57 is disposed about the wheel receiving portion of the axle 52 and extends generally forwardly and is pivotally mounted on the upper attaching bolt 33. Therefore, when, as described above, the plow 25 swings downwardly and rearwardly when the overload release mechanism trips, the rear wheel structure swings rearwardly and upwardly, moving out of the way of the plow bottom 25 as it swings back to pass over the obstruction.

Thus, both the cover disk attachment 35 and the rear wheel structure 50 are especially constructed and arranged, according to the present invention, to accommodate release of the plow bottom 25.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a plow, the combination of a plow frame, a bracket means connected therewith, a plow standard pivoted to the lower end of said bracket means, a moldboard type plow bottom fixed to the lower portion of said standard and having a moldboard extending to a point above the pivot of said standard, overload responsive release means connecting said standard with said frame, whereby when the plow bottom strikes a relatively unyielding obstruction, said standard and the lower part of said plow bottom swing generally rearwardly and the upper part of said moldboard swings generally forwardly, a cover disk disposable adjacent the upper portion of said moldboard for severing a portion of the upper edge of the furrow slice as it passes generally furrowwardly across the upper part of the moldboard, and disk-supporting means fixed to said standard and swingable with the latter when said overload responsive means operates to release said standard, whereby the cover disk swings generally with the upper part of the moldboard whenever the plow strikes an unyielding abutment and said overload responsive means releases said standard.

2. The invention set forth in claim 1, further characterized by said disk-supporting means including a generally vertical part fixed at its lower end to the lower portion of said standard below the pivot of the latter and disk mounting means on the upper portion of said vertical part.

3. The invention set forth in claim 1, further characterized by a rear wheel axle swingably connected with said brackets, a rear wheel journaled on said axle, and means connecting said axle with said disk-supporting means whereby when said disk and plow bottom swing about the standard pivot, as upon the occurrence of an overload, said wheel is shifted away from the path of swinging of said plow bottom.

4. In a plow, the combination of a plow frame, a generally vertically arranged plow standard pivoted to said frame so as to swing relative thereto about a generally transverse axis, overload-responsive release means connected to hold said standard against swinging about said axis when operating under normal conditions, a plow bottom fixed to the lower part of said standard and including a moldboard and a frog having a vertical standard-receiving portion lying substantially in the plane of the landward edge of the moldboard, a cover disk disposable adjacent the upper portion of said moldboard adjacent the landward edge of the latter for severing a portion of the upper edge of the furrow slice as it passes generally furrowwardly across the upper part of the moldboard, and cover disk supporting means including a generally vertical member having a lower plate portion lying against said vertical portion of the frog and an upper disk-receiving portion, and fastening means extending through said lower plate portion and said vertical portion of the frog for connecting said cover disk to said plow standard at a point generally below said transverse axis.

5. The invention set forth in claim 4, further characterized by a rear wheel axle swingably connected with said frame, a rear wheel journaled on said axle, and means connecting said axle with the lower plate portion of said disk-supporting means, said fastening means including a part extending through a lower portion of said pivoted standard, said vertical frog portion and said lower plate portion, and said axle-connecting means including a link pivotally connected with said axle and with said fastening part.

6. In a plow, the combination of a plow frame, bracket means connected therewith, a plow standard pivoted to the lower end of said bracket means, a moldboard type plow bottom fixed to the lower portion of said standard, overload responsive release means connecting said standard with said frame, whereby when the plow bottom strikes a relatively unyielding obstruction, said standard and the lower part of said plow bottom swings generally rearwardly, a rear wheel axle swingably connected with said bracket means and shiftable generally rearwardly and upwardly relative to said bracket means, a rear wheel journaled on said axle, and means connecting said axle with said plow bottom whereby when said disk and plow bottom swing about the standard pivot, as upon the occurrence of an overload, said wheel is shifted away from the path of swinging of said plow bottom.

References Cited in the file of this patent

UNITED STATES PATENTS

| | | |
|---|---|---|
| 1,965,575 | Clark | July 10, 1934 |
| 2,084,055 | Cascadden | June 15, 1937 |
| 2,722,877 | Altgelt | Nov. 8, 1955 |